(12) United States Patent
Yang et al.

(10) Patent No.: US 11,995,552 B2
(45) Date of Patent: May 28, 2024

(54) APPARATUS AND METHOD FOR MULTI-PHASE PRUNING FOR NEURAL NETWORK WITH MULTI-SPARSITY LEVELS

(71) Applicant: AJOU UNIVERSITY INDUSTRY-ACADEMIC COOPERATION FOUNDATION, Suwon-si (KR)

(72) Inventors: Hoeseok Yang, Suwon-si (KR); Kyusik Choi, Suwon-si (KR); Jeonggyu Jang, Cheongju-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 850 days.

(21) Appl. No.: 16/951,464

(22) Filed: Nov. 18, 2020

(65) Prior Publication Data

US 2021/0150363 A1 May 20, 2021

(30) Foreign Application Priority Data

Nov. 19, 2019 (KR) .................. 10-2019-0148658

(51) Int. Cl.
*G06N 3/082* (2023.01)
*G06F 17/16* (2006.01)

(52) U.S. Cl.
CPC ............. *G06N 3/082* (2013.01); *G06F 17/16* (2013.01)

(58) Field of Classification Search
CPC ................................ G06N 3/082; G06F 17/16
See application file for complete search history.

(56) References Cited

U.S. PATENT DOCUMENTS

| | | | |
|---|---|---|---|
| 2013/0290674 A1* | 10/2013 | George | G06F 8/314 712/201 |
| 2020/0026535 A1* | 1/2020 | Young | G06F 8/38 |
| 2020/0133831 A1* | 4/2020 | Whatmough | G06F 12/0207 |
| 2020/0134459 A1* | 4/2020 | Zeng | G05D 1/0088 |

FOREIGN PATENT DOCUMENTS

KR  10-2018-0084289 A  7/2018

* cited by examiner

*Primary Examiner* — Kyle R Stork
(74) *Attorney, Agent, or Firm* — Sughrue Mion, PLLC

(57) ABSTRACT

Disclosed are an apparatus and a method of multi-phase pruning a neural network with multi-sparsity levels and an SIMD-based neural network pruning method, and the SIMD-based neural network pruning method according to an exemplary embodiment of the present disclosure includes GEMM-transforming an internode weight kernel applied to a layer in a neural network; and pruning the GEMM-transformed weight kernel with a predetermined SIMD width as a unit.

11 Claims, 10 Drawing Sheets

[FIG. 1]
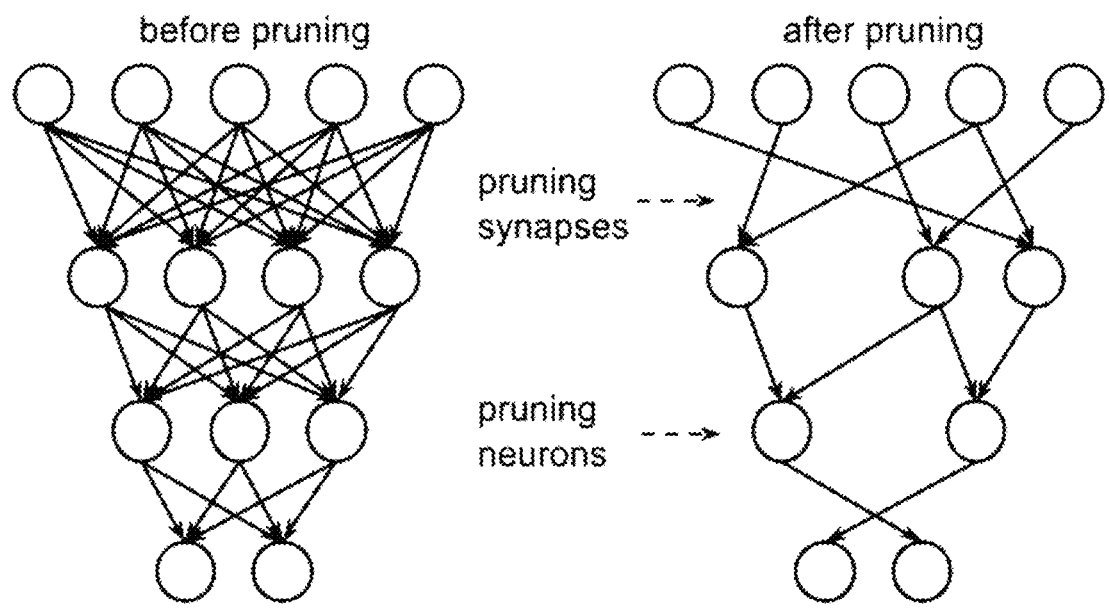

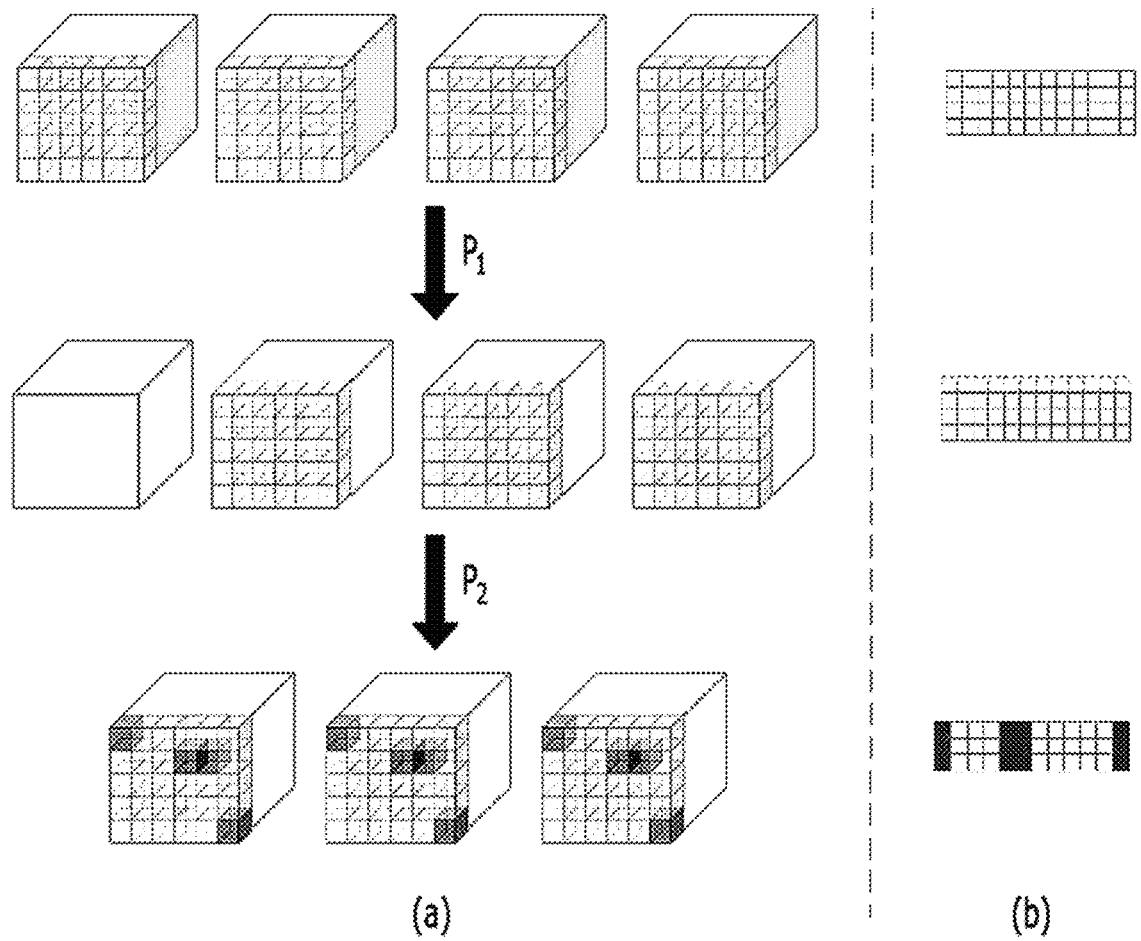
[FIG. 2]

[FIG. 3]
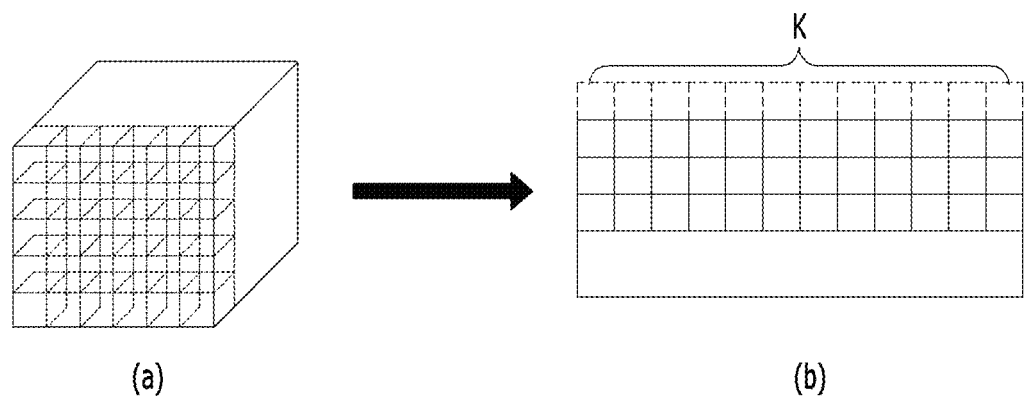
(a)            (b)

[FIG. 4]
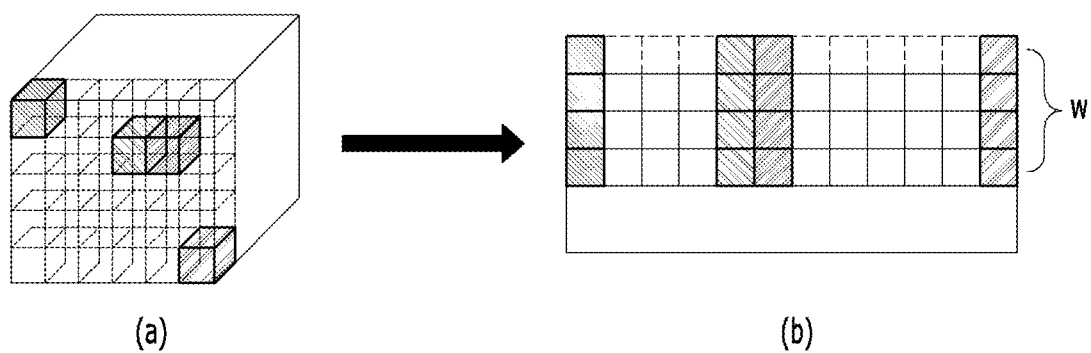
(a)　　　　　　　　　　　　　(b)

[FIG. 5]
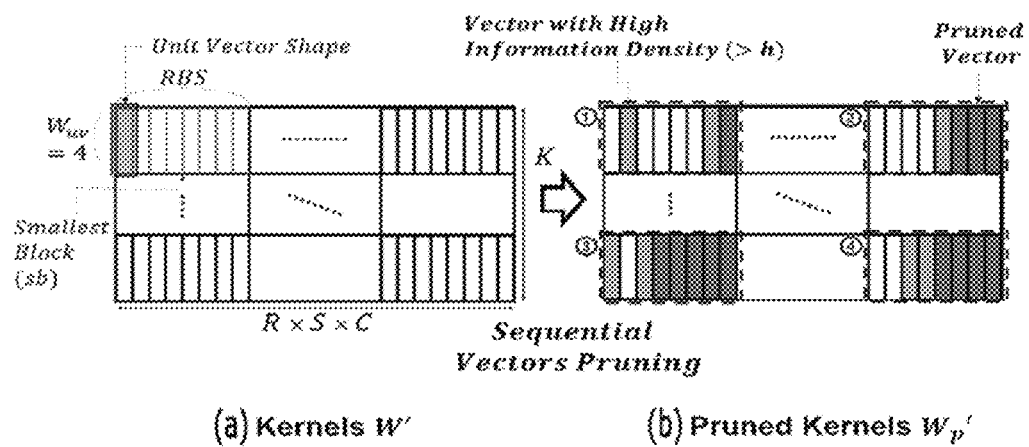

[FIG. 6]
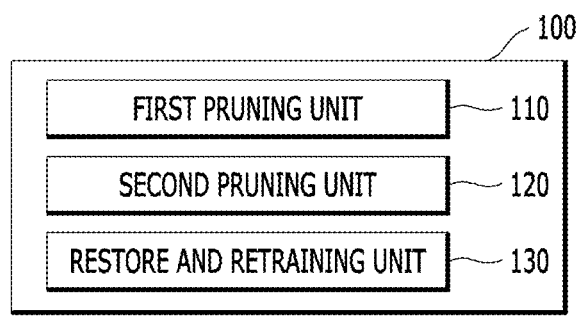

[FIG. 7]
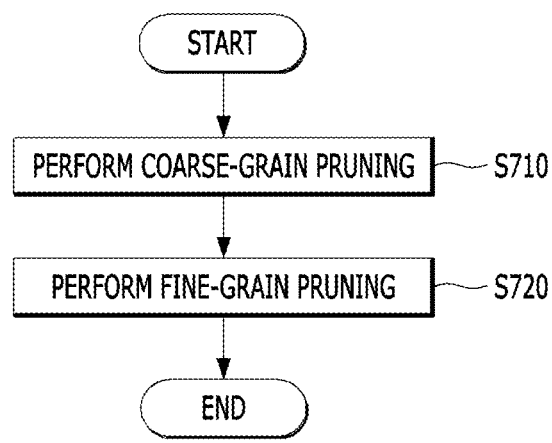

[FIG. 8]
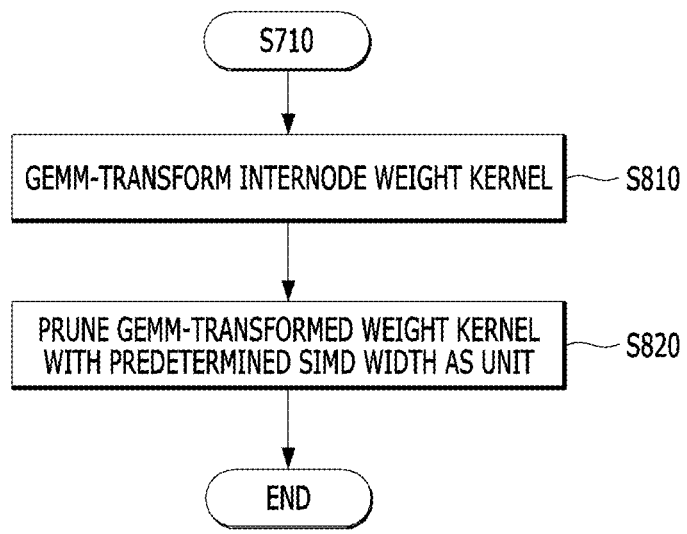

[FIG. 9]
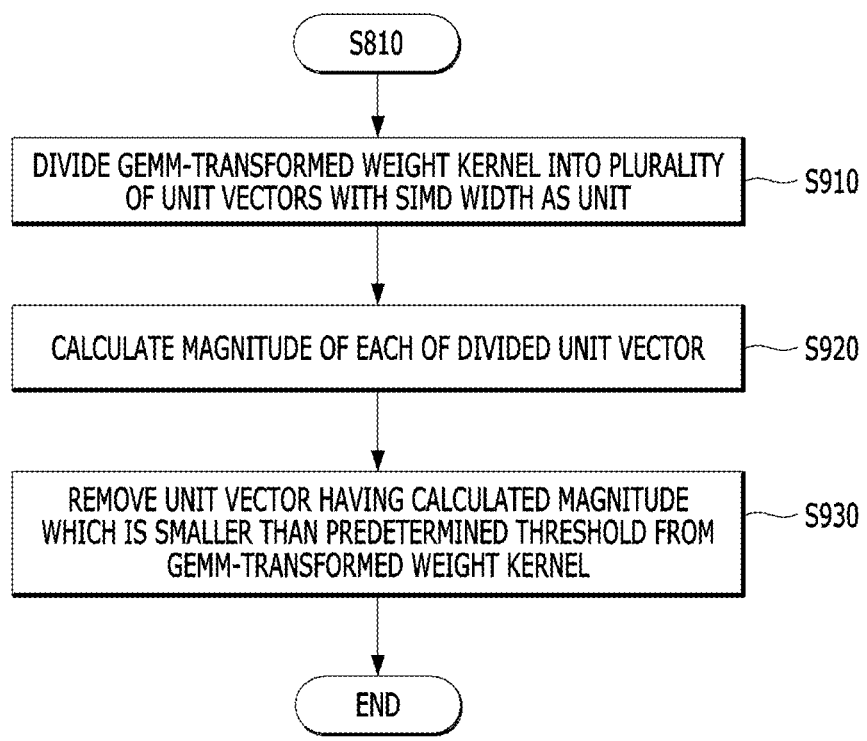

[FIG. 10]
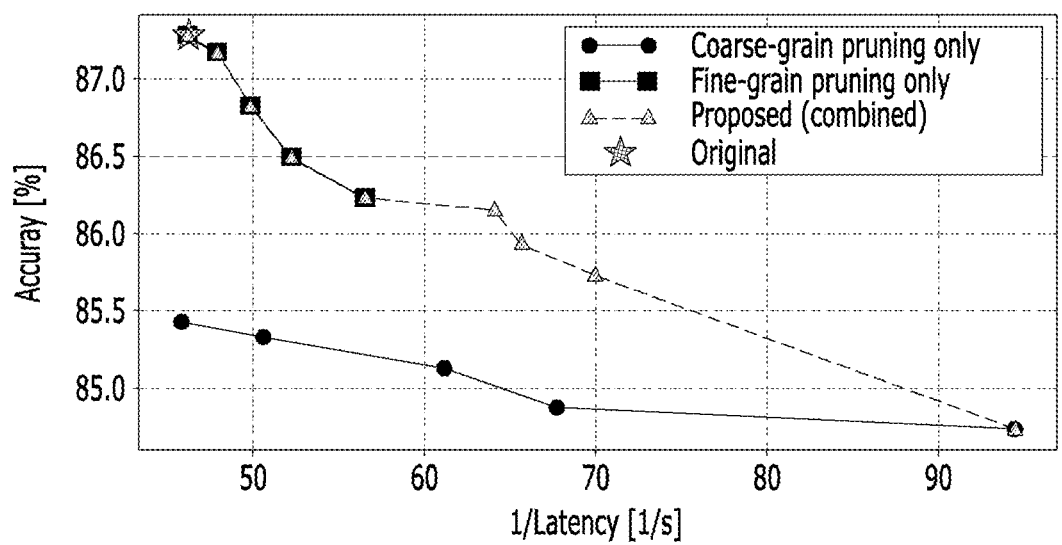

APPARATUS AND METHOD FOR MULTI-PHASE PRUNING FOR NEURAL NETWORK WITH MULTI-SPARSITY LEVELS

CROSS-REFERENCE TO RELATED APPLICATIONS

This application claims the priority of Korean Patent Application No. 10-2019-0148658 filed on Nov. 19, 2019, in the Korean Intellectual Property Office, the disclosure of which is incorporated herein by reference.

BACKGROUND

Field

The present disclosure relates to an apparatus and a method for multi-phase pruning for a neural network with multi-sparsity levels and more particularly, to a SIMD-based neural network pruning method.

Description of the Related Art

The pruning which is one of neural network compression techniques refers to a process of removing connection between neurons in a neural network. Generally, when the pruning is used, meaningless redundant connections in the network are reduced so that a lot of cost may be saved.

FIG. 1 is a view for explaining a pruning technique of the related art. Referring to FIG. 1, according to the pruning, importance of connections of neurons in a trained neural network is determined and then the connection is removed in the order of less importance. Here, the criterion of removing the neurons varies depending on the method and generally, a method of setting a weight of the neuron to zero is used. For reference, in FIG. 1, neurons which form a neural network are represented by circles and connections (weights) between the neurons are represented by a plurality of lines which connects the neurons.

Further, among the neural networks, in a convolutional neural network (CNN) field which is utilized today in various fields such as computer vision, speech recognition, and natural language processing, a depth of the neural network is getting deeper to improve the performance. For example, a model such as ResNet has been implemented such that a depth of the network is 100 layers or higher. As described above, as the depth of the neural network is getting deeper, a computation amount is also rapidly increased and thus the convolutional neural network is being implemented by a high performance accelerator such as a graphic processing unit (GPU) to shorten the computation time. However, a light-weight embedded system with limited resources, such as Internet of Things (IoT) devices which have generally low power consumption and have a ultra-small size, has a limitation in that it is difficult to utilize a high performance accelerator, such as a GPU. Therefore, it is important for the light-weight embedded system to accelerate the CNN by efficiently utilizing a central processing unit (CPU). In other words, when a CNN inference model applied to the embedded system is designed, the network needs to be designed by appropriately considering the constraints such as a computation cost, a memory size, and power.

In addition, today's CPUs are generally equipped with a single instruction multiple data (SIMD) function such as Intel AVX, or ARM NEON. The SIMD function refers to a function of providing data parallelism which performs a plurality of specific homogeneous computations in parallel. Such an SIMD function is utilized to improve a computation speed in application fields such as signal and image processing. With regard to this, when the pruning is performed in consideration of the SIMD to construct a CNN by utilizing a CPU equipped with the SIMD function, the computation processing speed may be improved while reducing the number of parameters by the pruning. However, even though the conventional pruning technique which has been developed until now has achieved a goal for reducing an amount of the parameters which are mainly utilized for the CNN, each pruning procedure is performed in an unstructured (parallel) manner so that in a normal system, it is not possible to identify weights removed by the pruning to omit a predetermined computation. Therefore, the performance improvement in terms of the computation processing speed is insufficient. For example, according to the pruning techniques, such as a kernel-wise pruning or filter pruning, which performs the pruning in the kernel units, the pruning is performed on the entire kernels as a removal unit so that there are limitations in that the speed is partially improved but the accuracy is significantly degraded. Further, the pruning technique of the related art which utilizes the SIMD function is performed only based on a special matrix transformation method such as a sparse matrix so that it is difficult to be widely utilized.

A related art of the present disclosure is disclosed in Korean Unexamined Patent Application Publication No. 10-2018-0084289.

SUMMARY

The present disclosure is provided to solve the problems of the related art and an object of the present disclosure is to provide an apparatus and a method of multi-phase pruning a neural network with multi-sparsity levels which improve a computation processing speed and reduce a number of parameters required to construct a neural network by applying a single instruction multiple data processing technique.

However, objects to be achieved by various embodiments of the present disclosure are not limited to the technical objects as described above and other technical objects may be present.

As a technical means to achieve the above-described technical object, an SIMD-based neural network pruning method according to an exemplary embodiment of the present disclosure includes GEMM-transforming an inter-node weight kernel applied to a layer in a neural network; and pruning the GEMM-transformed weight kernel with a predetermined SIMD width as a unit.

Further, the pruning includes: dividing the GEMM-transformed weight kernel into a plurality of unit vectors in consideration of the SIMD width; calculating a magnitude of each of the divided unit vectors; and removing the unit vector having the magnitude which is smaller than a predetermined threshold from the GEMM-transformed weight kernel.

Further, the removing of the unit vector from the GEMM-transformed weight kernel includes: comparing the magnitude of the unit vector and the predetermined threshold while exploring the unit vector in accordance with a predetermined direction which is set in advance for the GEMM-transformed weight kernel.

Further, the SIMD-based neural network pruning method according to an exemplary embodiment of the present disclosure may be performed by a CPU equipped with a SIMD function.

Further, the SIMD width may be determined-based on the SIMD processing capability of the CPU.

Further, the SIMD width may be determined so as to include any number of four to eight continuous cells of the GEMM-transformed weight kernel.

Further, the SIMD-based neural network pruning method according to the exemplary embodiment of the present disclosure may further include restoring at least some of internode weight kernels in the pruned neural network and retraining the restored internode weight kernels.

According to an aspect of the present disclosure, a neural network multi-phase pruning method with multi-sparsity levels includes performing coarse-grain pruning in kernel units on any one of layers in a neural network; and performing fine-grain pruning in SIMD units on the coarse-grain pruning result.

Further, the performing of fine-grain pruning includes: GEMM-transforming a weight kernel for the coarse-grain pruning result; and pruning the GEMM-transformed weight kernel with a predetermined SIMD width as a unit.

Further, the pruning with the SIMD width as a unit includes: dividing the GEMM-transformed weight kernel into a plurality of unit vectors with the SIMD width as a unit; calculating a magnitude of each of the divided unit vectors; and removing the unit vector having the magnitude which is smaller than a predetermined threshold from the GEMM-transformed weight kernel.

Further, during the performing of coarse-grain pruning, at least some continuous regions of an original weight kernel which is not GEMM-transformed may be removed from the original weight kernel.

Further, the neural network multi-phase pruning method with multi-sparsity levels may further include: restoring at least some of internode weight kernels in the pruned neural network and retraining the restored internode weight kernels.

In the meantime, according to an aspect of the present disclosure, a neural network multi-phase pruning apparatus with multi-sparsity levels includes: a first pruning unit which performs coarse-grain pruning in kernel units on any one of layers in a neural network; and fine-grain pruning in SIMD units on the coarse-grain pruning result.

Further, the second pruning unit GEMM-transforms a weight kernel for the coarse-grain pruning result; and prunes the GEMM-transformed weight kernel with a predetermined SIMD width as a unit.

Further, the second pruning unit divides the GEMM-transformed weight kernel into a plurality of unit vectors with the SIMD width as a unit; calculates a magnitude of each of the divided unit vectors, and removes the unit vector having the magnitude which is smaller than a predetermined threshold from the GEMM-transformed weight kernel.

Further, the first pruning unit removes at least some continuous regions of an original weight kernel which is not GEMM-transformed from the original weight kernel.

Further, the neural network multi-phase pruning apparatus with multi-sparsity levels may further include: a restore and retraining unit which restores at least some of internode weight kernels in the pruned neural network and retrains the restored internode weight kernels.

The above-described solving means are merely illustrative but should not be construed as limiting the present disclosure. In addition to the above-described embodiments, additional embodiments may be further provided in the drawings and the detailed description of the present disclosure.

According to the above-described solving means of the present disclosure, it is possible to provide an apparatus and a method of multi-phase pruning a neural network with multi-sparsity levels which improve a computation processing speed and reduce a number of parameters required to construct a neural network by applying a single instruction multiple data processing technique.

According to the above-described solving means of the present disclosure, an embedded system with limited resources may construct a convolutional neural network in which the computation processing is improved without having a separate high performance hardware such as a GPU and degradation of the accuracy is small.

However, the effect which can be achieved by the present disclosure is not limited to the above-described effects, there may be another effect.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a view for explaining a pruning technique of the related art;

FIG. 2 is a view for explaining coarse-grain pruning and fine-grain pruning performed by a neural network multi-phase pruning apparatus with multi-sparsity levels according to an exemplary embodiment of the present disclosure;

FIG. 3 is a view illustrating that continuous regions of a weight kernel are removed by coarse-grain pruning according to an exemplary embodiment of the present disclosure;

FIG. 4 is a view illustrating a state in which a part of a weight kernel is removed with respect to a SIMD unit by fine-grain pruning according to an exemplary embodiment of the present disclosure;

FIG. 5 is a conceptual view for explaining fine-grain pruning performed on a GEMM-transformed weight kernel according to an exemplary embodiment of the present disclosure;

FIG. 6 is a schematic diagram of a neural network multi-phase pruning apparatus with multi-sparsity levels according to an exemplary embodiment of the present disclosure;

FIG. 7 is a flowchart of an operation of a neural network multi-phase pruning method with multi-sparsity levels according to an exemplary embodiment of the present disclosure;

FIG. 8 is a flowchart of an operation of a SIMD-based neural network pruning method according to an exemplary embodiment of the present disclosure;

FIG. 9 is a flowchart of a detailed operation of a SIMD-based fine-grain pruning method according to an exemplary embodiment of the present disclosure; and FIG. 10 is a graph illustrating an accuracy performance and a speed performance when only coarse-grain pruning is performed, when only fine-grain pruning is performed, and both coarse-grain pruning and fine-grain pruning are performed together, as an experimental example related to a neural network multi-phase pruning method with multi-sparsity levels according to an exemplary embodiment of the present disclosure.

DETAILED DESCRIPTION OF THE EMBODIMENT

Hereinafter, the present disclosure will be described more fully hereinafter with reference to the accompanying drawings, in which exemplary embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" or "indirectly coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification of the present disclosure, unless explicitly described to the contrary, the word "comprise" and variations such as "comprises" or "comprising", will be understood to imply the inclusion of stated elements but not the exclusion of any other elements.

The present disclosure relates to an apparatus and a method for multi-phase pruning for a neural network with multi-sparsity levels, and more particularly, to a SIMD-based neural network pruning method.

FIG. 2 is a view for explaining coarse-grain pruning and fine-grain pruning performed by a neural network multi-phase pruning apparatus with multi-sparsity levels according to an exemplary embodiment of the present disclosure.

Referring to FIG. 2, a neural network multi-phase pruning apparatus 100 (hereinafter, referred to as a "neural network multi-phase pruning apparatus 100") having multi-sparsity levels according to an exemplary embodiment of the present disclosure may apply two steps of pruning techniques with multi-sparsity levels for an internode weight kernel applied to layers in a neural network. Specifically, the neural network multi-phase pruning apparatus 100 may sequentially perform coarse-grain pruning $P_1$ in the kernel units and fine-grain pruning $P_2$ in SIMD units on the internode weight kernel. However, the present disclosure is not limited thereto and if necessary, the neural network multi-phase pruning apparatus 100 may operate to perform any one of the coarse-grain pruning and the fine-grain pruning. For example, the neural network multi-phase pruning apparatus 100 may operate so as to apply different types of pruning (coarse-grain pruning or fine-grain pruning) to a plurality of layers included in a neural network to be pruned.

For reference, in the present disclosure, the neural network may include a convolutional neural network (CNN). However, the present disclosure is not limited thereto and the neural network to which the present disclosure is applied may include various neural networks (including a trained neural network or a neural network which is not trained) which has been known in the related art, such as a recurrent neural network (RNN), or will be developed in the future.

The neural network multi-phase pruning apparatus 100 may perform coarse-grain pruning in kernel units on any one of layers in the neural network. According to an exemplary embodiment of the present disclosure, the coarse-grain pruning may be referred to as kernel-wise pruning or filter pruning. Specifically, according to an exemplary embodiment of the present disclosure, the neural network multi-phase pruning apparatus 100 may entirely remove some weight kernels among predetermined internode weight kernels of the neural network by means of the coarse-grain pruning. In the present disclosure, the term weight kernel may also be referred to as a filter.

FIG. 3 is a view illustrating that continuous regions of a weight kernel are removed by coarse-grain pruning according to an exemplary embodiment of the present disclosure.

Referring to FIG. 3, the neural network multi-phase pruning apparatus 100 may remove at least some of continuous regions of an original weight kernel which is not GEMM-transformed from the original weight kernel by the coarse-grain pruning. The part (a) in FIG. 3 illustrates a general three-dimensional weight kernel and the part (b) in FIG. 3 illustrates that the three-dimensional weight kernel is transformed to a two-dimensional matrix by the GEMM-transformation. According to the exemplary embodiment of the present disclosure, an entire predetermined weight kernel as illustrated in the part (a) in FIG. 3 may be removed by the coarse-grain pruning. When it is described with respect to a weight kernel which is GEMM-transformed to a two-dimensional matrix as illustrated in the part (b) in FIG. 3, it is understood that one row of the weight kernel which is GEMM-transformed is removed.

For reference, the general matrix multiply (GEMM) transformation is a matrix transformation method which is broadly used in a deep learning inference engine today so that according to the present disclosure, the pruning is performed based on a transformation matrix which utilizes the GEMM-transformation. By doing this, the problems of the pruning technique of the related art in that a special sparse matrix such as a compressed sparse row (CSR), a compressed sparse column (CSC), or a coordinate list (COO) is utilized so that the pruning technique of the related art cannot be applied together with another type of pruning techniques are solved.

In a convolution layer of the CNN, rather than simple multiplication between matrices, complex computation which performs multiplication and summation between a plurality of values is performed on an input image or a feature map while sequentially sliding the weight kernel with a predetermined interval (for example, a predetermined stride unit) is performed several times. Therefore, in order to process such a complex convolution computation by a general matrix multiplication, the GEMM-transformation may be utilized to transform a three-dimensional feature map with a cube shape or the weight kernel to a two-dimensional matrix.

The coarse-grain pruning may improve the computation processing speed (for example, a learning speed) of the CNN to which the present disclosure is applied, but when only coarse-grain pruning is applied, the accuracy may be significantly degraded as it will be described below. Accordingly, the neural network multi-phase pruning apparatus 100 according to an exemplary embodiment may determine whether to apply the coarse-grain pruning based on a requirement for an accuracy of the convolution network to be implemented.

For example, when it is necessary to roughly classify or recognize an input image (in other words, in a situation in which a high accuracy is not required), the neural network multi-phase pruning apparatus 100 is implemented to apply the coarse-grain pruning. Further, in a situation in which it is necessary to accurately classify and recognize the input image, the neural network multi-phase pruning apparatus 100 may operate so as not to apply the coarse-grain pruning. Further, as another example, even though the coarse-grain pruning is applied, the neural network multi-phase pruning apparatus 100 may be implemented to determine different thresholds so as to determine a region to be removed from the weight kernel depending on a required accuracy.

FIG. 4 is a view illustrating a state in which a part of a weight kernel is removed with respect to an SIMD unit by fine-grain pruning according to an exemplary embodiment of the present disclosure and FIG. 5 is a conceptual view for explaining fine-grain pruning performed on a GEMM-transformed weight kernel according to an exemplary embodiment of the present disclosure.

Referring to FIGS. 4 and 5, the neural network multi-phase pruning apparatus 100 may perform fine-grain pruning in the SIMD units on a result of the coarse-grain pruning. In the description of the exemplary embodiment of the present disclosure, the fine-grain level pruning may also be referred to as fine-grain pruning.

In other words, the neural network multi-phase pruning apparatus 100 may subsequently apply the fine-grain pruning on the GEMM-transformed weight kernel from which some rows are removed by the previous coarse-grain pruning to determine a partial weight value which is removed in a finer (smaller) unit. Specifically, the neural network multi-phase pruning apparatus 100 may GEMM-transform the weight kernel for the coarse-grain pruning result and prune (remove) the GEMM-transformed weight kernel with a predetermined SIMD width as a unit.

The part (a) in FIG. 4 illustrates a general three-dimensional weight kernel before GEMM-transformation, and the part (b) in FIG. 4 illustrates that a three-dimensional weight kernel of the part (a) in FIG. 4 is transformed to a two-dimensional matrix by the GEMM-transformation.

Referring to FIG. 4, the SIMD unit which is a weight removal unit at the time of applying the fine-grain pruning may include a predetermined number of elements located in the same column (or a vertical line) of the GEMM-transformed weight kernel. Further, referring to FIG. 4, each weight included in one SIMD unit of the GEMM-transformed weight kernel may refer to a weight located in the same position for the plurality of kernels, with respect to the three-dimensional weight kernel.

For better understanding, four weight values included in the SIMD unit represented at the far left in the part (b) in FIG. 4 may refer to four weight values located in the same location (1, 1) in four continuous kernels overlapping in a depth direction in the part (a) in FIG. 4, with respect to a three-dimensional weight kernel. Similarly, four weight values included in the SIMD unit represented at the far right in the part (a) in FIG. 4 may refer to four weight values located in the same location (5, 5) in four continuous kernels overlapping in a depth direction in the part (a) FIG. 4, with respect to a three-dimensional weight kernel.

As described above, when the weights in the SIMD unit including a predetermined number of elements located in the same column of the GEMM-transformed weight kernel is removed (pruned) by the fine-grain pruning of the present disclosure, the weight values located in the corresponding same location in the plurality of weight kernels may be simultaneously removed.

Although in the above description, it has been described that one SIMD unit includes four elements (cells) allocated with a weight value, the present disclosure is not limited thereto. According to one exemplary embodiment, the SIMD width (unit) may be determined based on an SIMD processing capability of a CPU to which the present disclosure is applied. For example, the SIMD width (unit) may be determined to include any number of four to eight cells of the GEMM-transformed weight kernel which are continuous in a vertical direction.

Further, the SIMD processing capability of the CPU may refer to a number of values which can be simultaneously fetched by the CPU to process the same type of operation.

Referring to FIG. 5, when the fine-grain pruning is applied, the neural network multi-phase pruning apparatus 100 may divide the GEMM-transformed weight kernel W' into a plurality of unit vectors with the SIMD width $W_{uv}$ as a unit. Further, the neural network multi-phase pruning apparatus 100 may calculate a magnitude (for example, a norm value) of each of the divided unit vectors. Further, the neural network multi-phase pruning apparatus 100 may remove a unit vector which has a calculated magnitude smaller than a predetermined threshold h from the GEMM-transformed weight kernel.

According to an exemplary embodiment of the present disclosure, the neural network multi-phase pruning apparatus 100 may compare the magnitude of the unit vector and the predetermined threshold while exploring the unit vector in accordance with a predetermined direction which is set in advance for the GEMM-transformed weight kernel W'. In other words, the neural network multi-phase pruning apparatus 100 may operate to sequentially remove the unit vectors by comparing the magnitude and the threshold while sequentially exploring the unit vectors included in the GEMM-transformed weight kernel. For example, referring to the part (a) in FIG. 5, the predetermined direction which is set in advance may refer to a direction from a right direction to a left direction of the GEMM-transformed weight kernel W', but it is not limited thereto.

Further, referring to FIG. 5, a reduction block size (RBS) may be a variable value which varies in accordance with a hierarchy of a memory associated with the CPU to which the present disclosure is applied. Since the unit vector is the smallest unit which is simultaneously processed (removed or pruned) at the time of fine-grain pruning, the unit vector may be sequentially processed in a predetermined direction one by one at the time of fine-grain pruning. By setting the directivity as described above, the present disclosure may simplify the inference process. For example, a plurality of continuous unit vectors may be removed from a last location from each sub-block (here, one sub-block may include a unit vector as much as an RBS value set in advance in a horizontal direction) including a predetermined number of unit vectors. Accordingly, a basic structure of an inference engine which has been constructed in advance may be maintained and for example, when n unit vectors are pruned in a sub block, only a loop count value is changed from the existing RBS to an RBS-n and a basic structure of the inference engine may be maintained.

According to an exemplary embodiment of the present disclosure, a number of unit vectors which is pruned in each sub-block is determined by a predetermined threshold h. To be more specific, in each sub-block, a magnitude (12—norm value) of the unit vector is compared with a predetermined threshold from the last location (for example, from the rightmost location) and a unit vector having a magnitude (12—norm value) which is not larger than the predetermined threshold h may be continuously removed.

Referring to FIG. 5, from the rightmost unit vector of each of the sub-blocks (1) to (4), one, three, five, and four unit vectors may be removed, respectively. According to an exemplary embodiment of the present disclosure, a predetermined threshold h which is a criterion of removing a unit vector may be explored to reach a predetermined sparsity level, based on a Greedy Heuristic algorithm.

Although in the above description, it has been described that the neural network multi-phase pruning apparatus 100 performs the coarse-grain pruning first, and then subsequently to the coarse-grain pruning result, applies the fine-grain pruning, according to an exemplary embodiment, the neural network multi-phase pruning apparatus 100 of the present disclosure may operate to apply the fine-grain pruning only. For example, when a high accuracy performance is required for the convolutional neural network (CNN) to be constructed, the neural network multi-phase pruning apparatus 100 of the present disclosure may omit the coarse-grain pruning, but may apply the fine-grain pruning.

In other words, the neural network multi-phase pruning apparatus 100 GEMM-transforms the internode weight kernel applied to a layer in the neural network and prunes the GEMM-transformed weight kernel with the predetermined SIMD width as a unit.

Further, according to an exemplary embodiment of the present disclosure, the neural network multi-phase pruning apparatus 100 may restore at least some of the internode weight kernels in the pruned neural network and retrain the restored internode weight kernel. Further, the restoring and retraining procedures may be repeatedly performed several times depending on an exemplary embodiment. For reference, it is understood that a phase of the neural network is determined in accordance with the number of times of restoring and retraining. For example, a network in which the restoring and retraining procedure for the internode weight kernel is performed one time may be referred to as Phase 1 and a network in which the restoring and retraining procedure is performed two times may be referred to as Phase 2.

According to an exemplary embodiment of the present disclosure, several versions of neural networks may be constructed in accordance with the number of times of performing the restoring and retraining procedure and a designer may design a neural network which meets the required accuracy performance or speed performance by adjusting the number of times of performing the restoring and retraining procedure.

FIG. 6 is a schematic diagram of a neural network multi-phase pruning apparatus with multi-sparsity levels according to an exemplary embodiment of the present disclosure.

Referring to FIG. 6, the neural network multi-phase pruning apparatus 100 may include a first pruning unit 110, a second pruning unit 120, and a restore and retraining unit 130.

The first pruning unit 110 may perform coarse-grain pruning in kernel units on any one of layers in the neural network. According to an exemplary embodiment of the present disclosure, the first pruning unit 110 may remove at least some of continuous regions of an original weight kernel which is not GEMM-transformed from the original weight kernel. In other words, the first pruning unit 110 may remove one or more two-dimensionally weight kernel itself whose weight value does not reach the predetermined threshold from the original weight kernel including a plurality of two-dimensional weight kernels which is three-dimensionally arranged (Kernel-wise pruning).

The second pruning unit 120 may perform the fine-grain pruning in SIMD units, on the coarse-grain pruning result of the first pruning unit 110. Specifically, the second pruning unit 120 GEMM-transforms the weight kernel for a result of the coarse-grain pruning performed by the first pruning unit 110 and prunes the GEMM-transformed weight kernel with a predetermined SIMD width as a unit.

According to an exemplary embodiment of the present disclosure, the second pruning unit 120 divides the GEMM-transformed weight kernel into a plurality of unit vectors with the SIMD width as a unit and calculates a magnitude of each of the divided unit vectors, and removes the unit vector with a magnitude which is smaller than the predetermined threshold from the GEMM-transformed weight kernel.

The restore and retraining unit 130 restores at least some of the internode weight kernels in the pruned neural network and retrains the restored internode weight kernel.

Hereinafter, an operation flow of the present disclosure will be described in brief based on the above detailed description.

FIG. 7 is a flowchart of an operation of a neural network multi-phase pruning method with multi-sparsity levels according to an exemplary embodiment of the present disclosure. A neural network multi-phase pruning method with multi-sparsity levels illustrated in FIG. 7 may be performed by the neural network multi-phase pruning apparatus 100 which has described above. Therefore, even though some contents are omitted, the contents which have been described for the neural network multi-phase pruning apparatus 100 may be applied to the description of the neural network multi-phase pruning method with multi-sparsity levels in the same manner.

Referring to FIG. 7, in step S710, the first pruning unit 110 may perform coarse-grain pruning in kernel units on any one of layers in the neural network.

Next, in step S720, the second pruning unit 120 may perform the fine-grain pruning in SIMD units on the coarse-grain pruning result.

In the above-description, steps S710 and S720 may be further divided into additional steps or combined as smaller steps depending on an implementation example of the present disclosure. Further, some steps may be omitted if necessary and the order of steps may be changed.

FIG. 8 is an operational flowchart of a SIMD-based neural network pruning method according to an exemplary embodiment of the present disclosure.

The SIMD-based neural network multi-phase pruning method illustrated in FIG. 8 may be performed by the neural network multi-phase pruning apparatus 100 which has described above. Therefore, even though some contents are omitted, the contents which have been described for the neural network multi-phase pruning apparatus 100 may be applied to the description of the SIMD-based neural network multi-phase pruning method in the same manner.

Referring to FIG. 8, in step S810, the second pruning unit 120 may GEMM-transform the weight kernel. According to an exemplary embodiment, an original weight kernel which is GEMM-transformed in step S810 may be a result of the coarse-grain pruning performed by the first pruning unit 110 or an internode weight kernel which is applied to the layer in the neural network.

Next, in step S820, the second pruning unit 120 may prune the GEMM-transformed weight kernel with a predetermined SIMD width as a unit. According to an exemplary embodiment of the present disclosure, the SIMD-based neural network pruning method is performed by a CPU equipped with a SIMD function and the SIMD width may be determined based on a SIMD processing capability of the CPU.

According to an exemplary embodiment of the present disclosure, the SIMD width may be determined to include any number of four to eight continuous elements (cells) of the GEMM-transformed weight kernel.

Further, even though it is not illustrated in the drawings, the SIMD-based neural network pruning method and the neural network multi-phase pruning method with multi-sparsity levels may include a step of restoring at least some of internode weight kernels in the pruned neural network and retraining the restored internode weight kernel.

In the above-description, steps S810 and S820 may be further divided into additional steps or combined as smaller steps depending on an implementation example of the present disclosure. Further, some steps may be omitted if necessary and the order of steps may be changed.

FIG. 9 is a flowchart of a detailed operation of an SIMD-based fine-grain pruning method according to an exemplary embodiment of the present disclosure.

Referring to FIG. 9, in step S910, the second pruning unit 120 may divide the GEMM-transformed weight kernel into a plurality of unit vectors in consideration of the SIMD width.

Next, in step S920, the second pruning unit 120 may calculate the magnitude of each of the divided unit vectors.

Next, in step S930, the second pruning unit 120 may remove a unit vector having a calculated magnitude which is smaller than a predetermined threshold value from the GEMM-transformed weight kernel. According to an exemplary embodiment of the present disclosure, in step S930, the second pruning unit 120 may sequentially compare the magnitude of the unit vector and the predetermined threshold while exploring the unit vector in accordance with a predetermined direction which is set in advance for the GEMM-transformed weight kernel.

In the above-description, steps S910 to S930 may be further divided into additional steps or combined as smaller steps depending on an implementation example of the present disclosure. Further, some steps may be omitted if necessary and the order of steps may be changed.

FIG. 10 is a graph illustrating an accuracy performance and a speed performance when only coarse-grain pruning is performed, when only fine-grain pruning is performed, and both coarse-grain pruning and fine-grain pruning are performed, as an experimental example related to a neural network multi-phase pruning method with multi-sparsity levels according to an exemplary embodiment of the present disclosure.

Referring to FIG. 10, a performance evaluation experiment illustrated in FIG. 10 was performed based on VGG-11 trained by CIFAR-10 and hardware utilized for the performance evaluation experiment was NVIDIA Jetson AGX Xavier embedded with 8-core ARM v8.2 64-bit CPU. The SIMD width during the fine-grain pruning was set to 4 in consideration of the performance of the core of the platform utilized in the present performance evaluation experiment.

The graph illustrated in FIG. 10 represents a comparison observation result by considering trade-off between the accuracy and the speed when coarse-grain pruning or fine-grain pruning is individually applied or two types of pruning are applied together (combined). A target sparsity was set to 77% and the restore and retraining procedure was repeatedly performed to Phase 4.

Referring to FIG. 10, when only the coarse-grain pruning is performed (coarse-grain pruning only), it is confirmed that it is advantageous in terms of the speed, but an accuracy of 85.5% or higher cannot be achieved. In contrast, when only the fine-grain pruning is performed (fine-grain pruning only), a high accuracy level is provided, but the performance improvement in terms of the speed is insignificant as compared with the coarse-grain pruning only.

In summary, it is understood that the coarse-grain pruning and the fine-grain pruning have a complementary relationship in a 2D design space in consideration of the speed-accuracy. Further, according to the neural network multi-phase pruning method with multi-sparsity levels of the present disclosure in which two pruning methods are combined, the coarse-grain pruning to Phase 4 is applied to VGG-11 and the fine-grain pruning is additionally performed for a candidate with insufficient accuracy.

The measure of performance improvement of the Pareto solution as illustrated in FIG. 10 may be quantified by a hyper volume which is an area (volume) in a lower part of the Pareto solution graph which is generally discovered. When the hyper volume is calculated in the performance evaluation experiment, the constraints of the accuracy and the speed of the valid solution are assumed to be 80% and 40.0, respectively. Further, when both the fine-grain pruning and the coarse-grain pruning are applied together, it is confirmed that the hyper volume is improved by 2.745 times and 1.146 times as compared with the fine-grain pruning and the coarse-grain pruning, respectively.

The SIMD-based neural network pruning method and the neural network multi-phase pruning method with multi-sparsity levels according to the exemplary embodiment of the present disclosure may be implemented as a program instruction which can be executed by various computer means to be recorded in a computer readable medium. The computer readable medium may include solely a program instruction, a data file, and a data structure or a combination thereof. The program instruction recorded in the medium may be specifically designed or constructed for the present invention or known to those skilled in the art of a computer software to be used. Examples of the computer readable recording medium include a magnetic media such as a hard disk, a floppy disk, or a magnetic tape, an optical media such as a CD-ROM or a DVD, a magneto-optical media such as a floptical disk, and a hardware device which is specifically configured to store and execute the program instruction, such as a ROM, a RAM, and a flash memory. Examples of the program instruction include not only a machine language code which is created by a compiler but also a high-level language code which may be executed by a computer using an interpreter. The hardware device may operate as one or more software modules in order to perform the operation of the present invention and vice versa.

Further, the above-described SIMD-based neural network pruning method and the neural network multi-phase pruning method with multi-sparsity levels may be implemented as a computer program or an application executed by a computer stored in a recording medium.

The above-description of the present disclosure is illustrative only and it is understood by those skilled in the art that the present disclosure may be easily modified to another specific type without changing the technical spirit of an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A SIMD-based neural network pruning method, the neural network pruning method comprising:
   GEMM-transforming an internode weight kernel applied to a layer in a neural network; and
   pruning the GEMM-transformed weight kernel with a predetermined SIMD width as a unit,
   wherein the pruning of the GEMM-transformed weight kernel with the SIMD width as a unit includes:
   dividing the GEMM-transformed weight kernel into a plurality of unit vectors in consideration of the SIMD width,
   calculating a magnitude of each of the divided unit vectors, and
   removing the unit vector having the magnitude which is smaller than a predetermined threshold from the GEMM-transformed weight kernel,
   wherein the method is performed by a CPU equipped with a SIMD function and the SID width is determined based on the SID processing capability of the CPU, and
   wherein the SID width is determined to include any number of four to eight continuous cells of the GEMM-transformed weight kernel.

2. The neural network pruning method according to claim 1, wherein the removing of the unit vector from the GEMM-transformed weight kernel includes:
   comparing the magnitude of the unit vector and the predetermined threshold while exploring the unit vector in accordance with a predetermined direction which is set in advance for the GEMM-transformed weight kernel.

3. The neural network pruning method according to claim 1, further comprising:
   restoring at least some of internode weight kernels in the pruned neural network and retraining the restored internode weight kernels.

4. A neural network multi-phase pruning method with multi-sparsity levels, the neural network multi-phase pruning method comprising:
   performing coarse-grain pruning in kernel units on any one of layers in a neural network; and
   performing fine-grain pruning in SIMD units on the coarse-grain pruning; result,
   wherein the performing of fine-grain pruning includes:
   GEMM-transforming a weight kernel for the coarse-grain pruning result; and
   pruning the GEMM-transformed weight kernel with a predetermined SIMD width as a unit,
   wherein the pruning of the GEMM-transformed weight kernel with the SIMD width as a unit includes:
   dividing the GEMM-transformed weight kernel into a plurality of unit vectors with the SIND width as a unit,
   calculating a magnitude of each of the divided unit vectors, and
   removing the unit vector having the magnitude which is smaller than a predetermined threshold from the GEMM-transformed weight kernel,
   wherein the method is performed by a CPU equipped with a SIMD function and the SIMD width is determined based on the SIMD processing capability of the CPU, and
   wherein the SIND width is determined to include any number of four to eight continuous cells of the GEMM-transformed weight kernel.

5. The neural network multi-phase pruning method according to claim 4, wherein in the performing of coarse-grain pruning, at least some continuous regions of an original weight kernel which is not GEMNI-transformed are removed from the original weight kernel.

6. The neural network multi-phase pruning method according to claim 4, further comprising:
   restoring at least some of internode weight kernels in the pruned neural network and retraining the restored internode weight kernels.

7. The neural network pruning method according to claim 4, wherein the removing of the unit vector from the GEMM-transformed weight kernel includes:
   comparing the magnitude of the unit vector and the predetermined threshold while exploring the unit vector in accordance with a predetermined direction which is set in advance for the GEMM-transformed weight kernel.

8. A neural network multi-phase pruning apparatus with multi-sparsity levels, the multi-phase pruning apparatus comprising:
   a processor; and
   a memory storing instructions executable by the processor,
   wherein the processor is configured to:
   perform coarse-grain pruning in kernel units on any one of layers in a neural network; and
   perform fine-grain pruning in SIMD units on the coarse-grain pruning result,
   wherein the processor is further configured to:
   GEMM-transform a weight kernel for the coarse-grain pruning result, and
   prune the GEMM-transformed weight kernel with a predetermined SIMD width as a unit,
   wherein the pruning of the GEMM-transformed weight kernel with the SIMD width as a unit includes:
   dividing the GEMM-transformed weight kernel into a plurality of unit vectors with the SIND width as a unit,
   calculating a magnitude of each of the divided unit vectors, and
   removing the unit vector having the magnitude which is smaller than a predetermined threshold from the GEMM-transformed weight kernel,
   wherein the processor is equipped with a SIMD function and the SIMD width is determined based on the SIMD processing capability of the processor, and
   wherein the SIMD width is determined to include any number of four to eight continuous cells of the GEMM-transformed weight kernel.

9. The multi-phase pruning apparatus according to claim 8, wherein the processor is further configured to remove at least some continuous regions of an original weight kernel which is not GEMM-transformed from the original weight kernel.

10. The multi-phase pruning apparatus according to claim 8,
    wherein the processor is further configured to restore at least some of internode weight kernels in the pruned neural network and retrain the restored internode weight kernels.

11. The multi-phase pruning apparatus according to claim 8, wherein the removing of the unit vector from the GEMM-transformed weight kernel includes:
    comparing the magnitude of the unit vector and the predetermined threshold while exploring the unit vector in accordance with a predetermined direction which is set in advance for the GEMM-transformed weight kernel.

* * * * *